(12) United States Patent
Zapf

(10) Patent No.: US 10,434,912 B2
(45) Date of Patent: Oct. 8, 2019

(54) ARMREST BRAKE

(71) Applicant: GRAMMER AG, Amberg (DE)

(72) Inventor: Sebastian Zapf, Neustadt (DE)

(73) Assignee: GRAMMER AG, Amberg (DE)

( * ) Notice: Subject to any disclaimer, the term of this patent is extended or adjusted under 35 U.S.C. 154(b) by 25 days.

(21) Appl. No.: 15/239,318

(22) Filed: Aug. 17, 2016

(65) Prior Publication Data

US 2017/0050543 A1 Feb. 23, 2017

(30) Foreign Application Priority Data

Aug. 21, 2015 (DE) ........................ 10 2015 010 792

(51) Int. Cl.
*B60N 2/75* (2018.01)

(52) U.S. Cl.
CPC ............ *B60N 2/753* (2018.02); *B60N 2/767* (2018.02)

(58) Field of Classification Search
CPC ...... B60N 2/46; B60N 2/4606; B60N 2/4633; B60N 2/75; B60N 2/753; B60N 2/767
See application file for complete search history.

(56) References Cited

U.S. PATENT DOCUMENTS

| | | | | |
|---|---|---|---|---|
| 4,882,807 A | * | 11/1989 | Frye | E05D 11/06 16/225 |
| 4,953,259 A | * | 9/1990 | Frye | E05D 11/06 16/225 |
| 5,292,171 A | * | 3/1994 | Harrell | B60N 2/757 297/113 |
| 5,669,107 A | * | 9/1997 | Carlsen | E05D 11/082 16/348 |
| 6,132,128 A | * | 10/2000 | Burrows | B60N 2/4606 403/154 |
| 6,328,384 B1 | * | 12/2001 | Yamauchi | B60N 2/753 297/411.29 |
| 6,427,956 B1 | * | 8/2002 | Heckmann | B60N 2/753 248/118 |
| 8,789,881 B2 | * | 7/2014 | von Rothkirch und Panthen ....... B60N 2/77 297/113 |
| 2012/0126071 A1 | * | 5/2012 | Mayer | B60N 2/753 248/118 |
| 2012/0223564 A1 | * | 9/2012 | Andersson | B60N 2/787 297/411.3 |

FOREIGN PATENT DOCUMENTS

| | | | | |
|---|---|---|---|---|
| DE | 4437244 A1 | * | 4/1996 | ............ B60N 2/753 |
| DE | 102004020911 A1 | * | 11/2005 | ........... B61D 33/005 |
| DE | 102005033020 A1 | * | 6/2007 | ............ B60N 2/757 |
| JP | 2013-17608 A | | 9/2015 | |

* cited by examiner

*Primary Examiner* — Ryan D Kwiecinski
(74) *Attorney, Agent, or Firm* — Andrew Wilford

(57) ABSTRACT

A brake part for an armrest mount has an elastically deformable edge strip and a hole adjacent the edge strip. The edge strip is made of a predetermined material and forms a slide surface opposite the hole, and an elastically deformable element formed of a material different from that of the edge strip lies between the edge strip and the hole and supports the strip against deformation in a direction toward the hole. The edge strip and the element are depressable elastically in the direction into an expansion space formed by the hole.

11 Claims, 6 Drawing Sheets

ARMREST BRAKE

FIELD OF THE INVENTION

The invention relates first of all to a brake part for a brake of an armrest. The armrest is, for example, part of a vehicle seat.

BACKGROUND OF THE INVENTION

The armrest comprises an arm support that is pivotable between a nonuse position and a use position. In order to slow movement of the arm support between the nonuse position and the use position a brake is provided.

In DE 10 2010 051 699 [US 2010/0126071] an armrest with an arm support is disclosed, where a friction detent element with a sliding guide surface is provided, and a stop bolt or locking bolt slides along the surface during pivoting of the arm support. A resiliently deformable spring is provided between the friction detent element and a bearing bolt of the arm support, and the spring force leads to a frictional force between the sliding guide surface and the stop bolt or friction bolt that counteracts the pivoting movement.

DE 198 20 336 [U.S. Pat. No. 6,427,956] discloses an armrest that is pivotable about a pivot axis between two latching points of the supporting arrangement that delimit the pivot range. A stop moved by the armrest cooperates with the latching points. An elastic slide piece can brake the pivoting movement of the armrest and the armrest can be latched in the end position. The slide piece forms a slide track along which the stop slides. The slide track is part of a support that is formed elastically and exerts a normal force on the stop. In this way a frictional force is generated that slows movement of the armrest.

OBJECT OF THE INVENTION

It is an object of the invention to create a brake part for a brake in which a defined braking force can be generated. Furthermore, the brake part should be simple to produce.

SUMMARY OF THE INVENTION

The object has been attained by a brake part where the arm support is pivotable between a nonuse position and a use position. The arm support is mounted, for example, on the vehicle frame or, for example, on a vehicle seat. In the context of the invention a vehicle seat is also a rear bench seat. The armrest can, for example, be integrated into a seat back of such a rear bench seat. Alternatively, the armrest can, for example, be fastened to the seat back of a driver's or front passenger's seat.

Movement of the arm support between the nonuse position and the use position is slowed by a brake. This means that movement is slowed in both pivoting directions. The brake comprises first brake means associated with the arm support and movably connected thereto and second brake means associated with the vehicle frame. One of the brake means is formed by a brake part with an elastically deformable edge strip and the other brake means is formed by a retaining part with a brake member cooperating with the edge strip. A frictional force that counteracts and slows the pivoting movement of the arm support is generated by the contact of the brake member with the edge strip. In the armrest according to the invention the magnitude of the frictional force can be influenced particularly simply.

The edge strip can, for example, be on a brake part. The brake part can, for example, be movably connected to the arm support. The brake part can, for example, be pivoted together with the arm support. According to an alternative embodiment the brake part is fixed on the vehicle frame or the seat frame and is, for example, immovable. In this case the brake member is, for example, pivotably connected to the arm support.

The edge strip forms, for example, a slide surface for the brake member. The brake member slides along on the slide surface while the arm support is moved between the nonuse position and the use position. Friction that slows pivoting of the arm support is formed by the contact between the brake member and the edge strip. The edge strip can, for example, be produced from plastic or from metal or also from a composite material. The slide surface is, for example, approximately circular, and the pivot axis of the arm support forms the center of the circle.

The frictional force is generated by a press fit between the brake member and the edge strip. Because of its elastic restoring force, the elastically formed edge strip exerts, in any relative position between the brake member and the slide surface, a normal force on the brake member that leads to a braking frictional force. The over-pressing between the brake member and the edge strip can be, for example, 1 mm to 1.6 mm. Thus a braking torque of, for example, approximately 12 Nm is generated on the arm support.

At least one region of the edge strip can be elastically displaced into at least one expansion space that can be provided on a side of the edge strip lying opposite the brake member. The expansion space is, for example, formed in a brake part. The expansion space can, for example, be formed radially inward of the edge strip with respect to the pivot axis.

At least one web that supports the edge strip against the expansion direction is provided, for example, in the expansion space. The web is, for example, associated with a brake part and is supported on the edge strip and the hole edge of an expansion space of the brake part. The web can be relatively rigid or alternatively elastic.

At least two chambers are formed, for example, by the web. The chambers make it possible to influence the properties of the edge strip by their different configuration and/or by material received in the chambers. Because of the expansion spaces formed by the chambers, the individual chambers can contain different materials that influence the characteristic of the deformation of the edge strip in such a way that different regions have different elastic properties.

An elastic material is provided, for example, in the expansion space. This means that an elastic material can be provided in the expansion space or in individual or all chambers of the expansion space. It is also possible that no material is provided in specific chambers, while an elastic material is provided in other chambers. The elastic material likewise acts, for example, on the elastic properties, in particular on the restoring properties of the edge strip. The elastic material can, for example, be formed from a plastic.

The brake forms, for example, at least one latch seat for the brake member. A latch seat can be formed in such a way that the arm support is retained in the nonuse position and a defined force must be overcome in order to move the arm support out of the nonuse position. In addition or alternatively at least one other latch seat can be provided that is formed in such a way that the arm support is retained in the use position or in an intermediate position between the use position and the nonuse position, and wherein a defined force must also be overcome in order to move the arm support out of the use position.

The slide surface is, for example, limited to at least one end of the latch seat. This means that on at least one end the slide surface transitions into the latch seat and the brake member moves from the slide surface into the latch seat when the nonuse position is reached and/or when the use position is reached.

The brake member is formed, for example, by a cylindrical pin. The outer surface of the cylindrical pin slides, for example, on the slide surface.

The brake member is, for example, fastened to a retaining plate. The retaining plate is, for example, securely fastened to a seat or to the vehicle. The retaining plate can, for example, also form at least one end stop for at least one stop fixed on the armrest, in order to limit the pivoting movement in at least one direction.

According to a second aspect of the invention, the invention relates to an armrest mount.

Such an armrest mount comprises a brake having first brake means associated with a pivotable arm support and movably connected thereto, and second brake means associated with the vehicle frame, in particular a vehicle seat, wherein a brake part with an elastically depressable edge strip is part of one of the brake means, and a retaining part with a brake member is part of the other brake means.

The above-mentioned prior art is relevant for such an armrest mount.

It is an also object of the invention to create an armrest mount with a brake by which a defined braking force can be generated. Furthermore, the brake should be simple to manufacture.

With regard to the advantages and embodiments of the invention, reference is made to the statements with regard to the first aspect of the invention.

According to a third aspect of the invention, the invention relates to an armrest.

Such an armrest comprises an arm support that can be mounted on the vehicle frame, in particular on a vehicle seat, so as to be pivotable between a nonuse position and a use position. For mounting of the armrest an armrest mount and a brake are provided, wherein the brake brakes the pivoting movement of the arm support during movement between the nonuse position and the use position.

The above-mentioned prior art is relevant for such an armrest mount.

It is an object of the invention to create an armrest with a brake by which a defined braking force can be generated. Furthermore, the brake should be simple to produce.

With regard to the advantages and embodiments of the invention reference is made to the statements with regard to the first aspect of the invention.

According to a fourth aspect of the invention, the invention relates to a vehicle seat with an armrest.

Such a vehicle seat comprises an armrest with a mount for pivotable mounting as well as a brake for braking an arm support during the pivoting movement.

The above-mentioned prior art is relevant for such an armrest mount.

It is an object of the invention to create a vehicle seat with an armrest that has a brake by which a defined braking force can be generated. Furthermore, the brake should be simple to produce.

With regard to the advantages and embodiments of the invention reference is made to the statements with regard to the first aspect of the invention.

BRIEF DESCRIPTION OF THE DRAWING

Further advantages are disclosed with reference to an embodiment illustrated in the drawings. In the drawings.

SPECIFIC DESCRIPTION OF THE INVENTION

Figure 1:
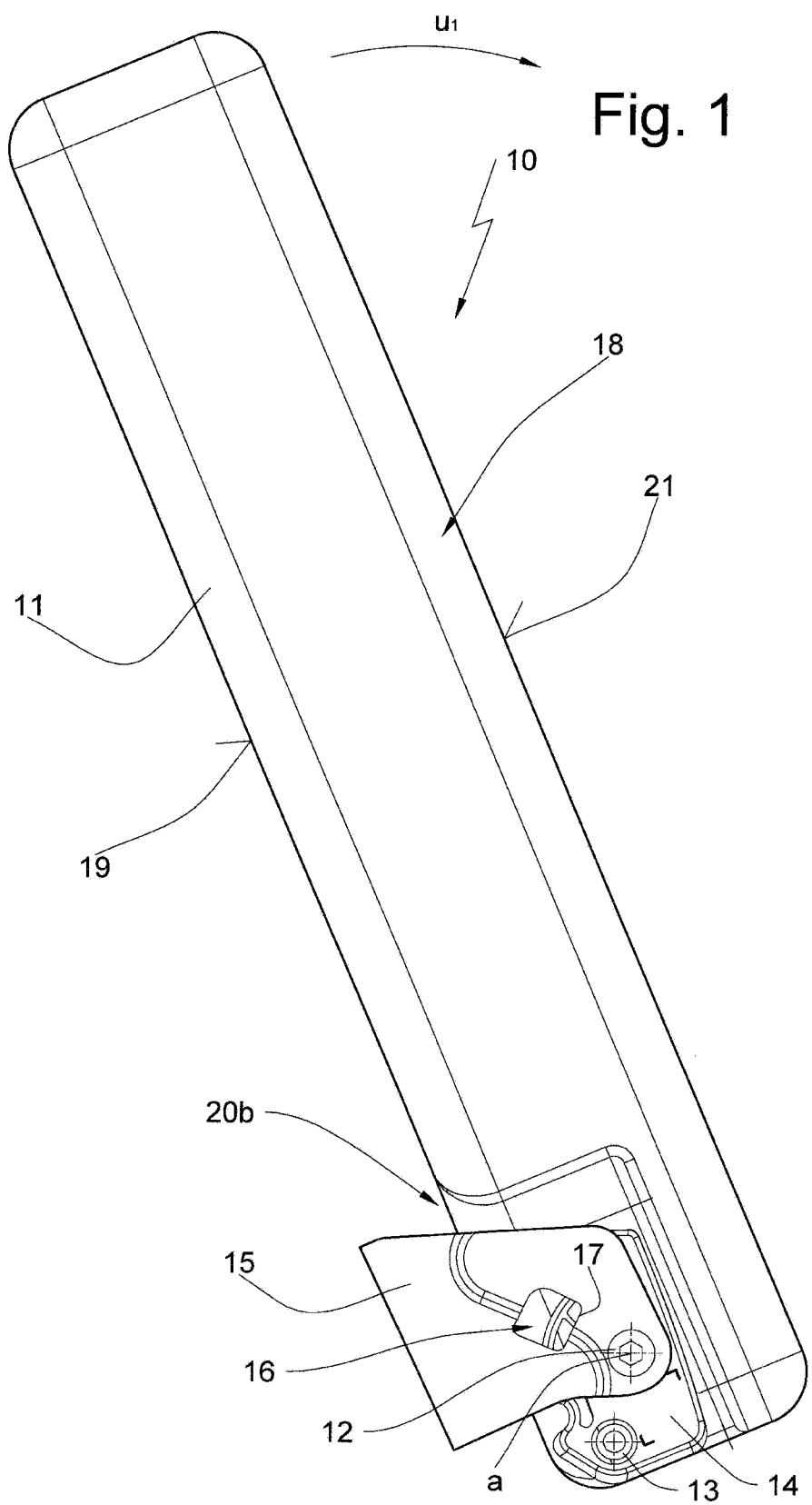
FIG. 1 shows a first embodiment of the armrest in a nonuse position.

In the drawings an armrest is shown generally at 10. The same reference numerals in the different figures designate corresponding parts, even if lower-case letters are added or omitted.

In FIG. 1, the armrest is shown in the nonuse position. The armrest 10 comprises an arm support 11 with padding 18. The arm support 11 is mounted on the frame of a vehicle seat (not shown) so as to be pivotable about a pivot axis a in the directions u1 and u2. For example, the arm support 11 can be integrated into the seat back of a rear bench seat or can be retained on the backrest of a front vehicle seat.

Figure 2:
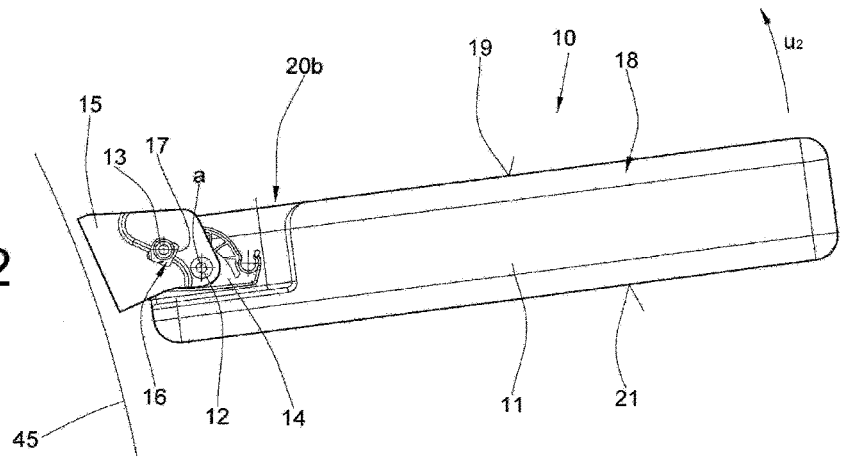
FIG. 2 shows the armrest according to FIG. 1 in a use position.

The arm support 11 is pivotable between the nonuse position illustrated in FIG. 1 and a use position illustrated in FIG. 2. From the nonuse position the arm support 11 can be pivoted in the direction u1 toward the use position. From the use position the arm support 11 can be pivoted in the direction u2 toward the nonuse position. In the use position the vehicle occupants can lean on a support face 19 of the arm support 11. In the nonuse position the occupant sees a back face 21 of the arm support 11.

The pivot axis a is formed by two bearings 12 that are fitted in a projection (not shown in FIG. 1) of the arm support 11 on two opposite sides 20a and 20b of the arm support 11. It should be mentioned that the arm support 11 is mounted on opposite sides 20a and 20b, even if the pivotable mounting is only illustrated in the drawings and described here in relation to one side. Thus the same parts and structures are located on both sides of the arm support 11.

Furthermore, FIG. 1 shows a stop pin 13 that is eccentric with respect to the pivot axis a on the arm support 11 and forms a stop.

A brake part 14 is fixed on the arm support 11 so that it pivots together with the arm support 11. A retaining part 15 is fixed on the seat frame. The bearing 12 is guided by the retaining part 15 and is screwed with a thread into the projection 22 of the arm support 11. The retaining part 15 is formed with a hole 16 whose edge 17 forms an end stop for the pin 13.

Figure 3:
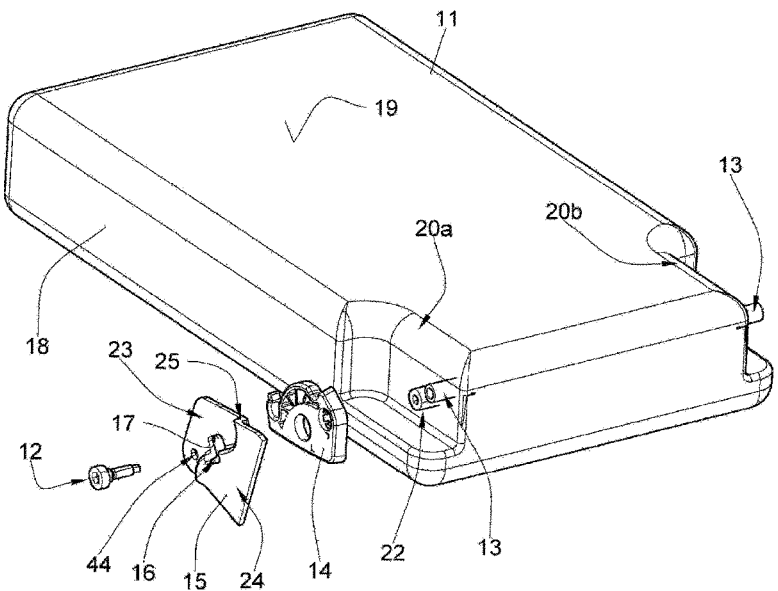
FIG. 3 is a perspective exploded view to the rear of an arm support, a brake part and a retaining plated.
Figure 4:
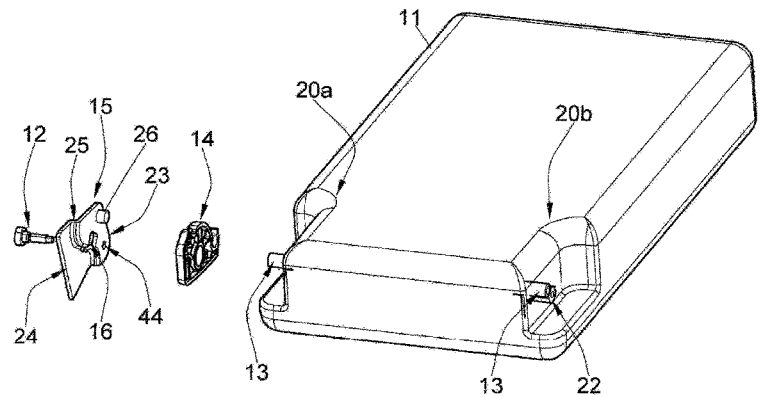
FIG. 4 is another exploded perspective view from the rear of the arm support, the brake part and the retaining plate.

FIG. 3 is an exploded view of the armrest 11, with the arm support 11 in the use position. A tubular projection 22 holding the bearing 12 and forming the pivot axis a can be seen on the arm support 11. The holding part 15 has two approximately parallel plate-shaped regions 23 and 24 that are offset relative to one another and are connected to one another by a web 25. The retaining part 15 has a hole 44 for mounting the bearing 12. Moreover, the exploded view of FIG. 4 shows that a brake member 26 is formed on the retaining part 15 and cooperates with the brake part 14. The brake member 26 is formed, for example, by a cylindrical pin and extends, for example, approximately parallel to the bearing axis a.

Figure 5:
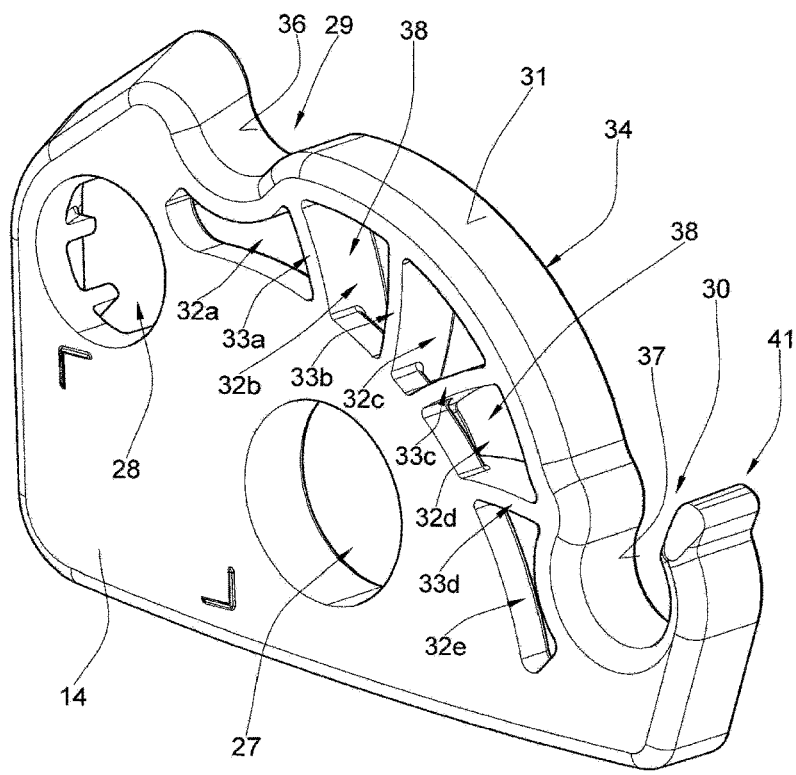
FIG. 5 is an individual detail view of the brake part.

In FIG. 5 the brake part 14 is shown in detail. It is formed with a hole 27 through which the tubular projection 22 passes in the assembled state and an hole 28 through which the stop pin 13 passes. Latch seats 29 and 30 are formed on the brake part 14. In the use position of the arm support 11 the latch seat 29 fits in the brake member 26 and in the nonuse position the latch seat 30 fits in the brake member 26. During movement of the arm support 11 between the use position and the nonuse position the brake member 26 slides over a slide surface 31 of the brake part 14. The slide surface 31 is formed on an elastically deformable edge strip 34.

The slide surface 31 is shaped as a circular segment, and the pivot axis a forms the center point of the circular segment. Radially inward of the slide surface 31 and the latch seats 29 and 30, the brake part 14 is formed with holes 32a, 32b, 32c, 32d and 32e that form an expansion space 38 for the edge strip 34. The holes 32a to 32e are separated from one another by webs 33a, 33b, 33c and 33d.

According to an alternative embodiment (not shown), the holes 32a to 32e can, for example, be at least partially filled with a material. The material may for example be elastic. In this way the braking properties of the slide surface can be set more precisely.

According to an alternative embodiment, for example in contrast to the illustration in FIG. 5, at least one web of the webs 33a to 33d is not present. For example, the webs 33b and 33c could be omitted.

FIG. 5 shows that the outer face 36 of the latch seat 29 is part cylindrical and at least partially complementary to the brake member 26. An outer face 37 of the latch seat 30 also is part cylindrical and at least partially complementary to the brake member 26. However, in the latch seat 30 the outer face 37 surrounds the brake member 26 over a greater angle. It surrounds, for example, approximately two thirds of the circumference of the brake member 26. The brake member 26 can only leave the latch seats 29 and 30 if the actuating force is sufficient to deform the brake part 14 elastically. The latch seat 30 comprises an elastically deformable projection 41 that springs back as the brake member enters or leaves.

With reference to FIG. 5 it is also conceivable that during movement of the arm support 11 between the use position and the nonuse position the brake part 14 is rotated relative to the brake member 26 fixed on the retaining part 15 so that the brake member 26 slides over the slide surface 31. An interference fit is formed between the slide surface 31 and the brake member 26 so that the slide surface 31 is deformed by engagement with the brake member 26 radially inward toward the pivot axis a and exerts an opposite force on the brake member 26 so the frictional force between the slide surface 31 and the brake member 26 is increased.

The frictional force can be set very precisely because of the holes 32a, 32b, 32c, 32d and 32e and the webs 33a, 33b, 33c and 33d. The webs 33a to 33d form a reinforcement of the sliding member 34. The elasticity, in particular in the radial direction, can be influenced by the addition or omission of the webs 33a to 33d and by their relative positions. The holes 32a to 32e form chambers that, for example—as already mentioned above—can be at least partially filled with a material, in particular an elastic material. The rigidity of the sliding member 34 can likewise be influenced by the properties of its material, in particular by the property of being capable of elastic deformation.

Figure 6:
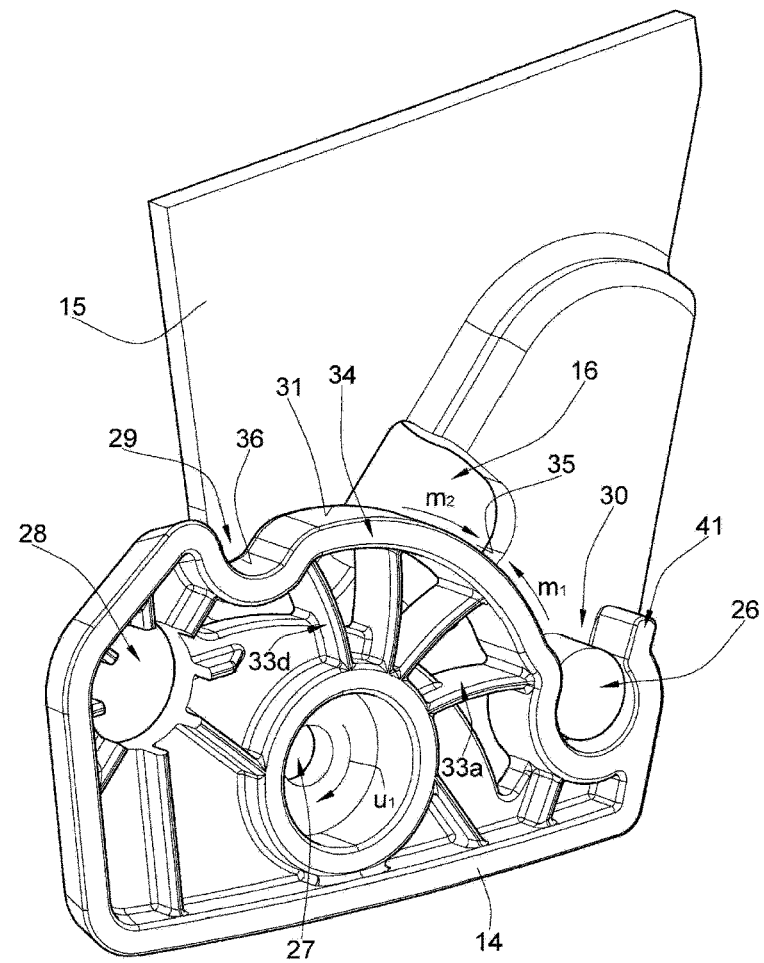
FIG. 6 shows the brake part and the retaining plate with a brake member in the nonuse position.

FIG. 6 shows the relative position between the brake part 14 and the retaining part 15 in the nonuse position. The brake member 26 is received in the latch seat 30.

After overcoming the resistance against the deformation of the latch seat 30 and/or the slide surface 31, the arm support 11 can be pivoted out of the nonuse position in the direction u1. In this case the brake part 14 movably connected to the arm support 11 moves about the pivot axis a in the direction u1 and the brake member 26 slides on the surface 31. With reference to FIG. 6 it is conceivable that the stop pin 13 passing through the hole 28 can extend past the region 24 because of the offset of the regions 23 and 24 of the retaining part 15, but can strike against one stop surface 35 of the hole edge 17, because this surface is in the path of movement of the stop pin 13.

Figure 7:
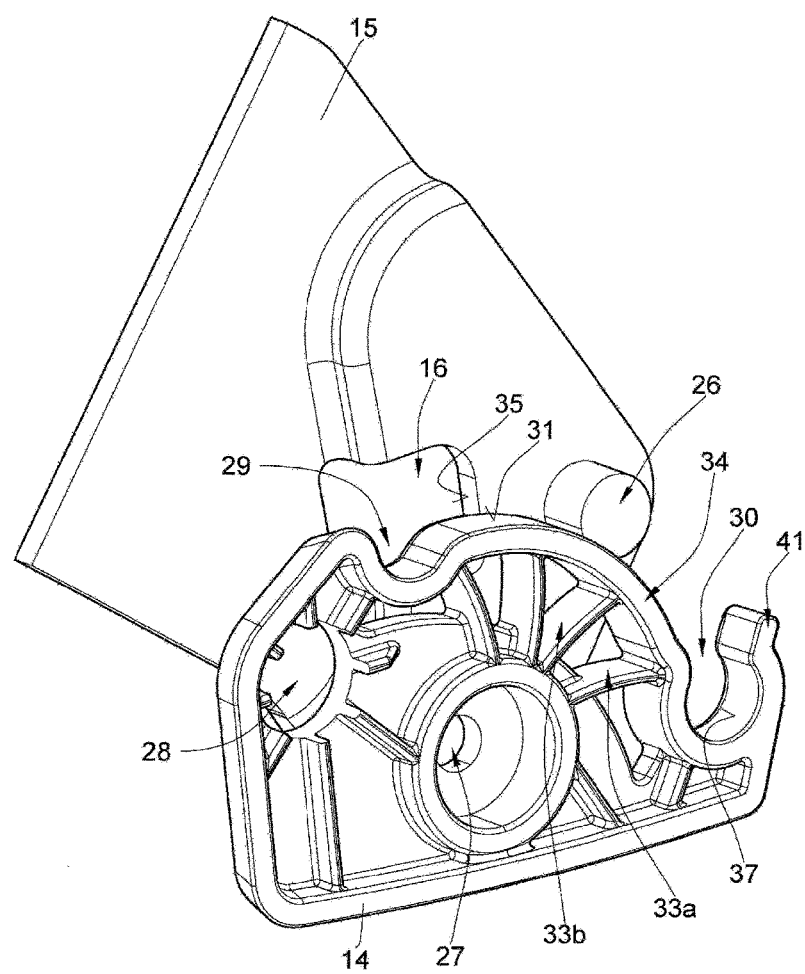
FIG. 7 shows the brake part and the retaining plate in an intermediate position between the use position and the nonuse position.

FIG. 7 shows an intermediate position of the arm support 11 in which the brake member 26 is in contact with the slide surface 31. During movement from the nonuse position of the arm support 11 into the use position, the brake member 26 slides on the surface 31 in the direction m1. In this case the brake part 14 is braked by friction between the brake member 26 and the slide surface 31. This has the effect that the arm support 11 is likewise braked, and thus the arm support 11 can only be moved further against resistance. In this case the webs 33a to 33d reinforce the edge strip 34 in such a way that it provides a specific resistance against deformation.

Figure 8:
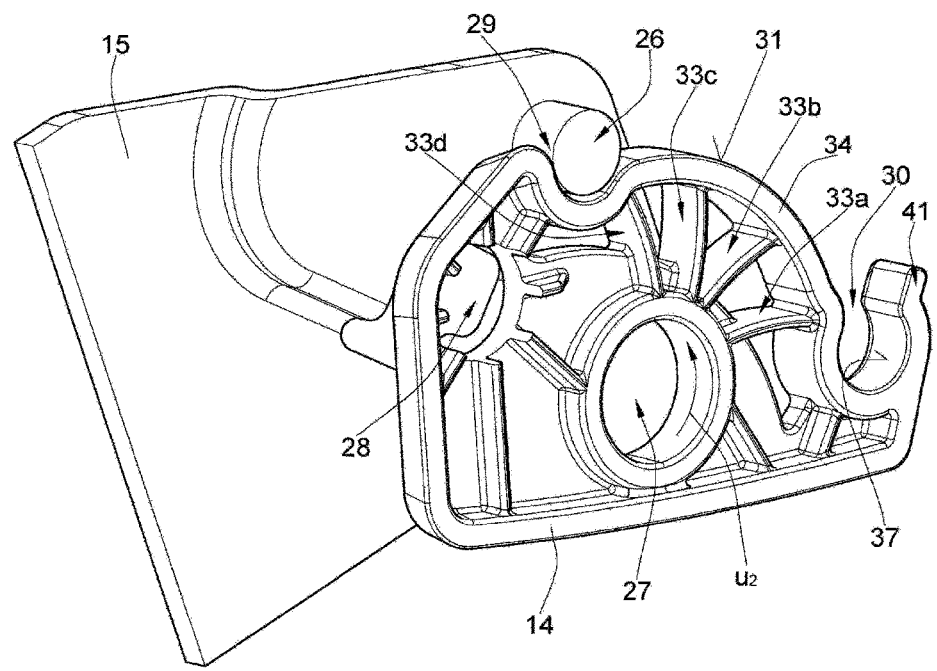
FIG. 8 shows the brake part and the retaining plate in the use position.

If the arm support 11 is in the use position, the brake member 26 is engaged in the latch seat 29 according to FIG. 8. The stop pin 13 is in contact with the stop surface 35 of the hole edge 17.

If the arm support 11 is pivoted out of the use position in the direction u2, the brake member 26 slides on the slide surface 31 in the direction m2.

Figure 9:
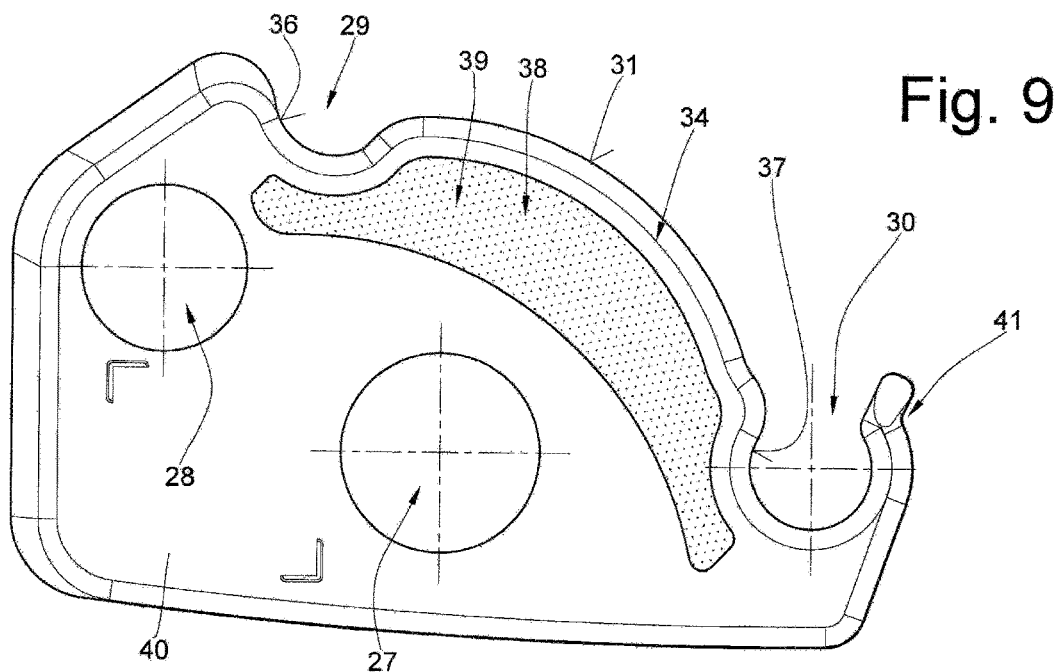
FIG. 9 is a elevational view of a second embodiment of the brake part.

FIG. 9 shows a brake part 40 according to an alternative embodiment that only differs from the embodiment illustrated in FIGS. 1 to 8 by the feature that the expansion space 38 is not divided by the web. In the embodiment according to FIG. 9 an elastic material 39 is provided in the expansion space 38.

Figure 10A:
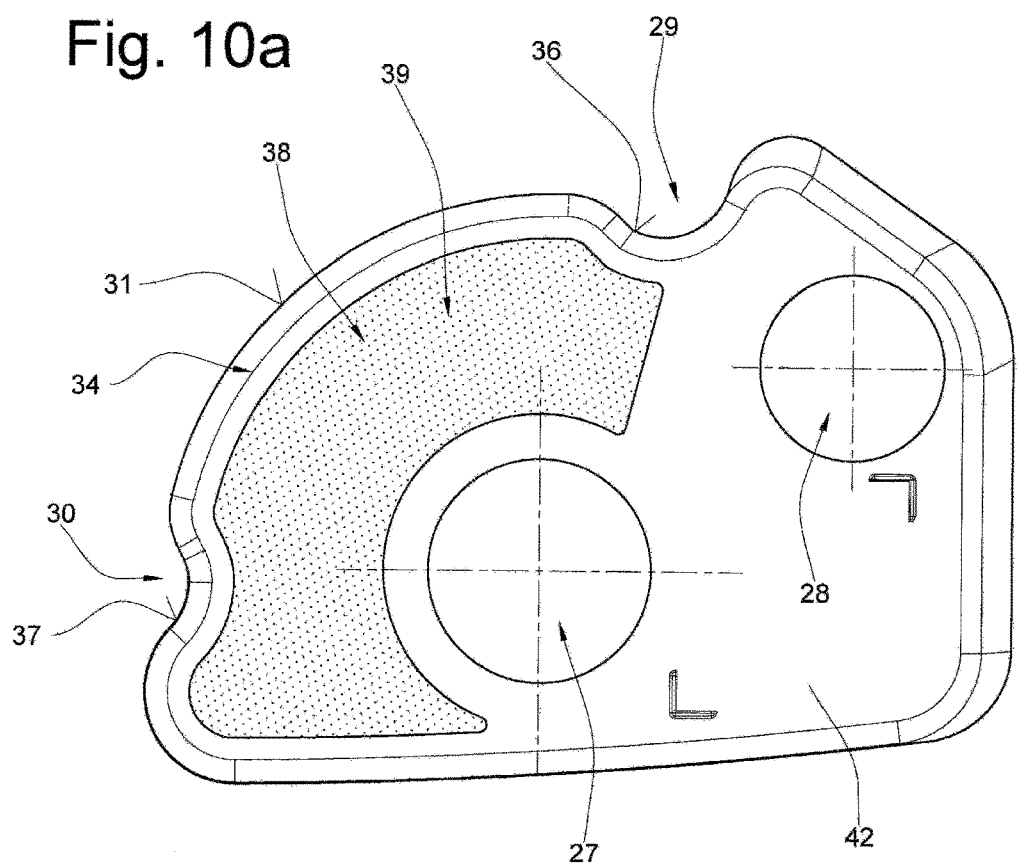
FIG. 10a is a elevational view of a third embodiment of the brake part.
Figure 10B:
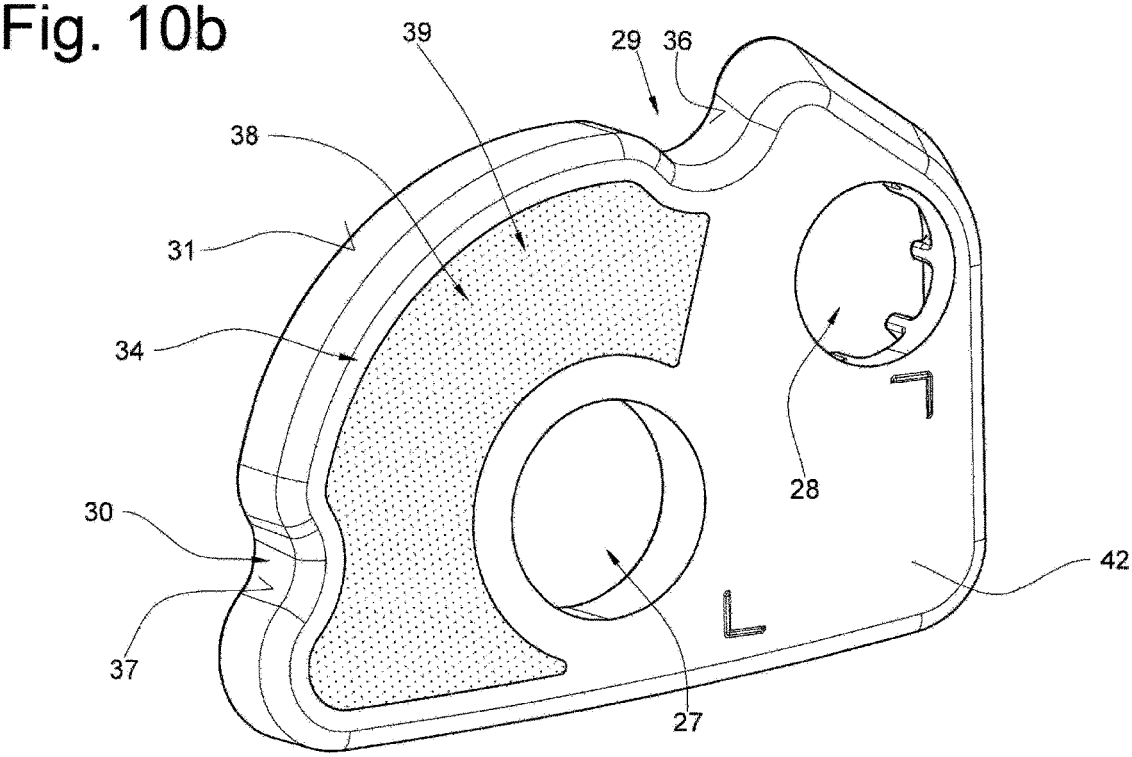
FIG. 10b is a perspective view of the brake part according to FIG. 10a, and FIG. 11 is a elevational view of a fourth embodiment of the brake part.

The embodiment of a brake part 42 according to FIGS. 10a-10b corresponds substantially to the embodiment according to FIG. 9, and differs therefrom in that the latch seat 30 is designed so that the brake member 26 can be moved more easily out of the nonuse position. An elastically deformable projection is not present. Moreover, the expansion space 38 is shaped differently. An elastic material 39 that influences the elastic deformation of the edge strip 34 is provided in the expansion space.

Figure 11:
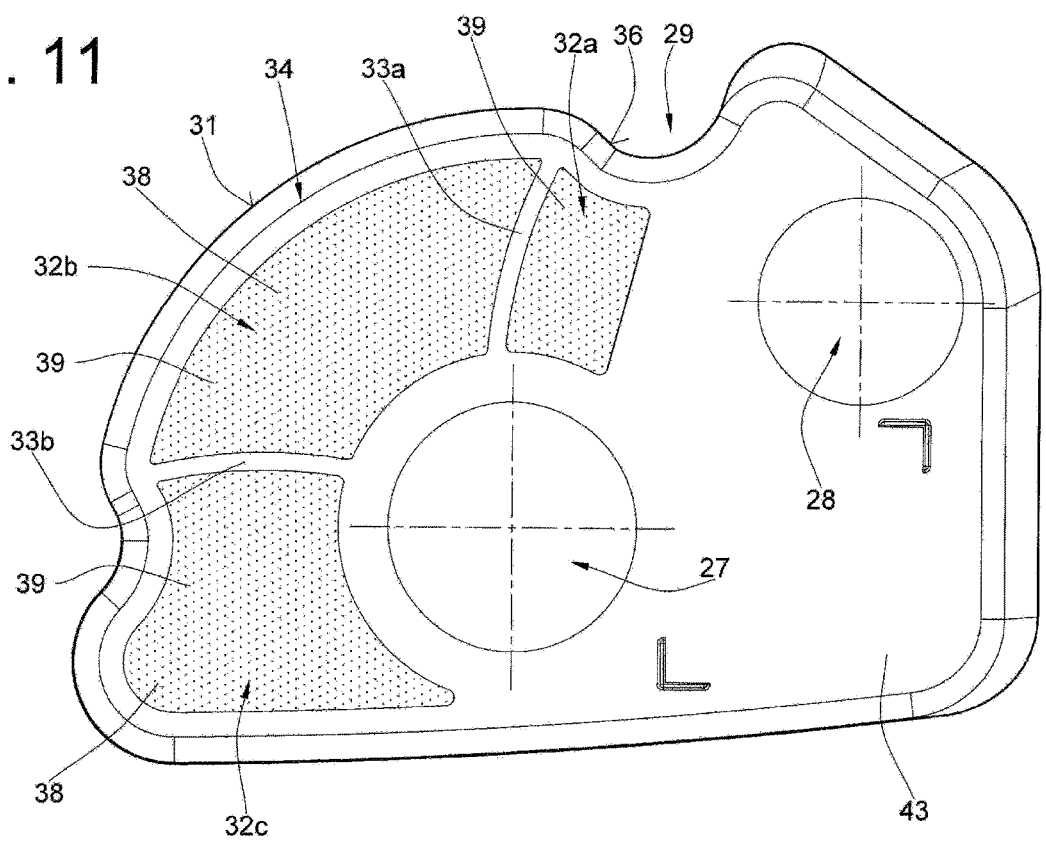

The brake part 43 according to FIG. 11 corresponds substantially to the embodiment according to FIG. 10, and differs therefrom in that two webs 33a and 33b divide the expansion space 38 into three holes 32a, 32b, 32c and support the edge strip 34.

The invention claimed is:

1. A brake part for an armrest mount comprising an elastically deformable edge strip and a hole adjacent the edge strip, wherein
the edge strip is made of a predetermined material and forms a slide surface opposite the hole,
an elastically deformable element at least partially fills the hole adjacent the edge strip, influences elastic properties of the edge strip, and supports the strip against deformation in a direction toward the hole; and
the edge strip is elastically deformable in the direction into an expansion space formed by the hole.

2. The brake part according to claim 1, wherein the element is a web.

3. The brake part according to claim 2, wherein the hole is subdivided by the web into at least two chambers.

4. The armrest defined in claim 3, wherein the chambers contain different materials.

5. The brake part according to claim 1, further comprising:
a latch seat formed by the brake part.

6. The brake part according to claim 5, wherein the slide surface is delimited on an end by the latch seat.

7. An armrest mount for a brake having a first brake associated with a pivotable arm support and pivotably connected thereto, and a second brake associated with the vehicle frame, the mount comprising:
a brake part as defined in claim 1 and having the edge strip forming part of one of the first and second brakes, and
a retaining part with a brake member is part of the other of the first and second brake and co-operates with the brake part of the one brake for braking the arm support.

8. The armrest mount according to claim 7, wherein the brake member is formed by a cylindrical pin.

9. An armrest with an arm support mountable on the vehicle frame so as to be pivotable between a nonuse position and a use position, the armrest comprising:
an armrest mount as defined in claim 7 for mounting the armrest, the brake resisting pivoting movement of the arm support during movement between the nonuse position and the use position.

10. The armrest according to claim 9, wherein the retaining part forms an end stop that cooperates with a stop of the arm support.

11. A vehicle seat with an armrest according to claim 9.

* * * * *